(12) United States Patent
Engan et al.

(10) Patent No.: US 11,438,168 B2
(45) Date of Patent: Sep. 6, 2022

(54) AUTHENTICATION TOKEN REQUEST WITH REFERRED APPLICATION INSTANCE PUBLIC KEY

(71) Applicant: T-Mobile USA, Inc., Bellevue, WA (US)

(72) Inventors: Michael Engan, Bellevue, WA (US); Douglas McDorman, Sammamish, WA (US); James Latham, Redmond, WA (US); Vikash Kodati, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 427 days.

(21) Appl. No.: 16/205,089

(22) Filed: Nov. 29, 2018

(65) Prior Publication Data

US 2019/0312730 A1    Oct. 10, 2019

Related U.S. Application Data

(60) Provisional application No. 62/653,539, filed on Apr. 5, 2018.

(51) Int. Cl.
*H04L 9/00* (2022.01)
*H04L 9/32* (2006.01)
(Continued)

(52) U.S. Cl.
CPC .......... *H04L 9/3247* (2013.01); *H04L 9/0643* (2013.01); *H04L 9/0825* (2013.01);
(Continued)

(58) Field of Classification Search
CPC .... H04L 9/3247; H04L 9/3073; H04L 932/13
(Continued)

(56) References Cited

U.S. PATENT DOCUMENTS 6,328,217 B1 * 12/2001 Everett .............. G06K 19/0719
235/492
6,668,322 B1    12/2003 Wood et al.
(Continued)

OTHER PUBLICATIONS

The International Search Report and Written Opinion for PCT Application No. PCT/US2018/056157, dated Feb. 7, 2019, 11 pages.

(Continued)

*Primary Examiner* — Christopher J Brown
(74) *Attorney, Agent, or Firm* — Han Santos, PLLC

(57) ABSTRACT

A server application may request an authentication token from an authentication token provider on behalf of a client application instance. An application instance public key of a client application instance may be received at the server application, in which the application instance public key belongs to an application instance public-private key pair of the client application instance. An authentication token request is generated at the server application, in which the request includes the application instance public key of the client application instance and is signed with a server application private key of a server application public-private key pair that belongs to the server application. The authentication token request is sent by the server application to an authentication token provider to request an authentication token for use by the client application instance.

20 Claims, 7 Drawing Sheets

(51) Int. Cl.
  *H04L 9/08* (2006.01)
  *H04L 9/40* (2022.01)
  *H04L 9/06* (2006.01)
  *H04L 9/30* (2006.01)

(52) U.S. Cl.
  CPC .......... *H04L 9/3073* (2013.01); *H04L 9/3213* (2013.01); *H04L 63/168* (2013.01)

(58) Field of Classification Search
  USPC ........................................................ 713/159
  See application file for complete search history.

(56) References Cited

U.S. PATENT DOCUMENTS

| | | | |
|---|---|---|---|
| 6,842,863 B1 | 1/2005 | Fox et al. | |
| 6,983,381 B2* | 1/2006 | Jerdonek | H04L 63/0272 726/5 |
| 7,711,122 B2 | 5/2010 | Allen et al. | |
| 7,849,326 B2 | 12/2010 | Chao | |
| 8,601,553 B1 | 12/2013 | Griffin et al. | |
| 8,880,889 B1 | 11/2014 | Ward et al. | |
| 9,240,886 B1 | 1/2016 | Allen et al. | |
| 9,264,902 B1 | 2/2016 | Ward et al. | |
| 9,331,990 B2 | 5/2016 | Saint | |
| 9,462,473 B2 | 10/2016 | Ward et al. | |
| 9,641,344 B1 | 5/2017 | Kim | |
| 9,692,757 B1* | 6/2017 | Mikulski | H04L 9/3234 |
| 9,947,008 B1 | 4/2018 | Diaz | |
| 10,735,425 B2* | 8/2020 | Tran | H04L 63/10 |
| 2003/0120610 A1* | 6/2003 | Hamber | G06Q 30/06 705/67 |
| 2006/0021004 A1 | 1/2006 | Moran et al. | |
| 2006/0168446 A1 | 7/2006 | Ahonen et al. | |
| 2006/0264202 A1* | 11/2006 | Hagmeier | H04L 67/02 455/411 |
| 2008/0189778 A1 | 8/2008 | Rowley | |
| 2009/0328207 A1 | 12/2009 | Patel | |
| 2010/0329464 A1 | 12/2010 | Kerschbaum | |
| 2012/0144202 A1 | 6/2012 | Counterman | |
| 2013/0031361 A1 | 1/2013 | Fahn et al. | |
| 2013/0191884 A1 | 7/2013 | Leicher et al. | |
| 2013/0219473 A1 | 8/2013 | Schaefer | |
| 2013/0347071 A1 | 12/2013 | Moragon et al. | |
| 2014/0013396 A1 | 1/2014 | Field-Eliot et al. | |
| 2014/0250003 A1 | 9/2014 | Levchin et al. | |
| 2014/0325640 A1 | 10/2014 | Aggarwal et al. | |
| 2014/0366080 A1 | 12/2014 | Gupta et al. | |
| 2015/0113283 A1 | 4/2015 | Corella et al. | |
| 2015/0150109 A1 | 5/2015 | Bocanegra et al. | |
| 2015/0281362 A1 | 10/2015 | Shanmugam et al. | |
| 2015/0295930 A1 | 10/2015 | Dixon et al. | |
| 2015/0341330 A1 | 11/2015 | Field-Eliot et al. | |
| 2016/0094531 A1 | 3/2016 | Unnikrishnan et al. | |
| 2016/0142409 A1 | 5/2016 | Frei et al. | |
| 2016/0241405 A1* | 8/2016 | Jeong | H04L 63/0428 |
| 2016/0300223 A1 | 10/2016 | Grey et al. | |
| 2016/0344635 A1 | 11/2016 | Lee et al. | |
| 2017/0171187 A1 | 6/2017 | Yin et al. | |
| 2017/0289197 A1 | 10/2017 | Mandyam et al. | |
| 2018/0219863 A1 | 8/2018 | Tran | |
| 2019/0044940 A1 | 2/2019 | Khalil et al. | |
| 2019/0165942 A1 | 5/2019 | Subramaniam et al. | |
| 2019/0312733 A1 | 10/2019 | Engan et al. | |

OTHER PUBLICATIONS

The Non-Final Office Action for U.S. Appl. No. 15/788,731, dated Feb. 7, 2019, 34 pages.
M. Jones et al., 'Proof-of-Possession Key Semantics for JSON Web Tokens (JWTs)', IETF RFC 7800, Apr. 1, 2016 See pp. 4-9 and figures 1, 2.
International Application No. PCT/US2018/047373, International Search Report and Written Opinion dated Dec. 11, 2018, 12 pages.
U.S. Appl. No. 15/788,731, Final Office Action dated Jun. 7, 2019, 19 pages.
U.S. Appl. No. 15/828,266, Notice of Allowance dated Sep. 24, 2019, 14 pages.
U.S. Appl. No. 15/683,666, Final Office Action dated Jun. 21, 2019, 17 pages.
U.S. Appl. No. 15/683,666, Non Final Office Action dated Feb. 8, 2019, 21 pages.
U.S. Appl. No. 15/683,666, Notice of Allowance dated Jan. 14, 2020, 27 pages.
U.S. Appl. No. 15/788,731 Notice of Allowance dated Aug. 26, 2019, 7 pages.
3GPP; Technical Specification Group Services and System Aspects; 3rd Generation Partnership Project; Security Aspects; Study on Service Based Architecture (SBA) Security (Release 15), 3GPP TR 33.855 V0.1.0, May 2018. See Section 6.2.2.2.1 and Section 6.2.2.2.2.
European Patent Application No. 18847769.9, Extended Search Report dated Mar. 10, 2021, 8 pages.
European Patent Application No. 18868374.2, Extended European Search Report, dated Mar. 9, 2021, 14 pages.
M Jones: Proof-of-Possession Key Semantics for JSON Web Tokens (JWTs, IETF RFC 7800, Apr. 1, 2016 (Apr. 1, 2016), pp. 4-9, XP055597051, Retrieved from the Internet: URL: https://tools.ietf.org/pdf/rfc7800.pdf [retrieved on Jun. 17, 2019].
Navas Renzo E at al.: "Nonce-based authenticated key establishment over OAuth 2.0 IoT proof-of-possession architecture", 2016 IEEE 3rd World Forum on Internet of Things (WF-IoT), IEEE, Dec. 12, 2016 (Dec. 12, 2016), URL: https://hal.archives-ouvertes.fr/hal-01522039/file/01-IEEEWFIoTOAuthAKEPaper-V1-ThenRolledBack.pdf [retrieved on Jun. 17, 2021].
U.S. Appl. No. 16/366,340, Notice of Allowance dated Mar. 30, 2021, 71 pages.
Office Action for U.S. Appl. No. 16/776,879, dated Dec. 24, 2021, 8 pages.
Stallings, Cryptography and Network Security—Principles and Practice, 2011, 5th Ed., Prentice Hall, pp. 360-400.
Chinese Patent Application No. 201880054665.7, Office Action dated Jan. 21, 2022, 9 pages.
European Patent Application No. 18847769.9, Office Action dated Dec. 22, 2021, 5 pages.

* cited by examiner

AUTHENTICATION TOKEN REQUEST WITH REFERRED APPLICATION INSTANCE PUBLIC KEY

CROSS-REFERENCE TO RELATED PATENT APPLICATION

This application claims priority to U.S. Provisional Patent Application No. 62/653,539, filed on Apr. 5, 2018, which is hereby incorporated by reference in its entirety.

BACKGROUND

Virtually any web application that is accessible today uses authentication tokens to authenticate a user requesting access to the application. The use of authentication tokens allows a user to access multiple secure servers that host web applications after a single login, rather than the user having to individually log into each secure server that the user attempts to access. However, since such authentication tokens are stored and transmitted by the user devices of users to secure servers, these authentication tokens are susceptible to being stolen and used by a malicious actor to gain unauthorized access to a secure server.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
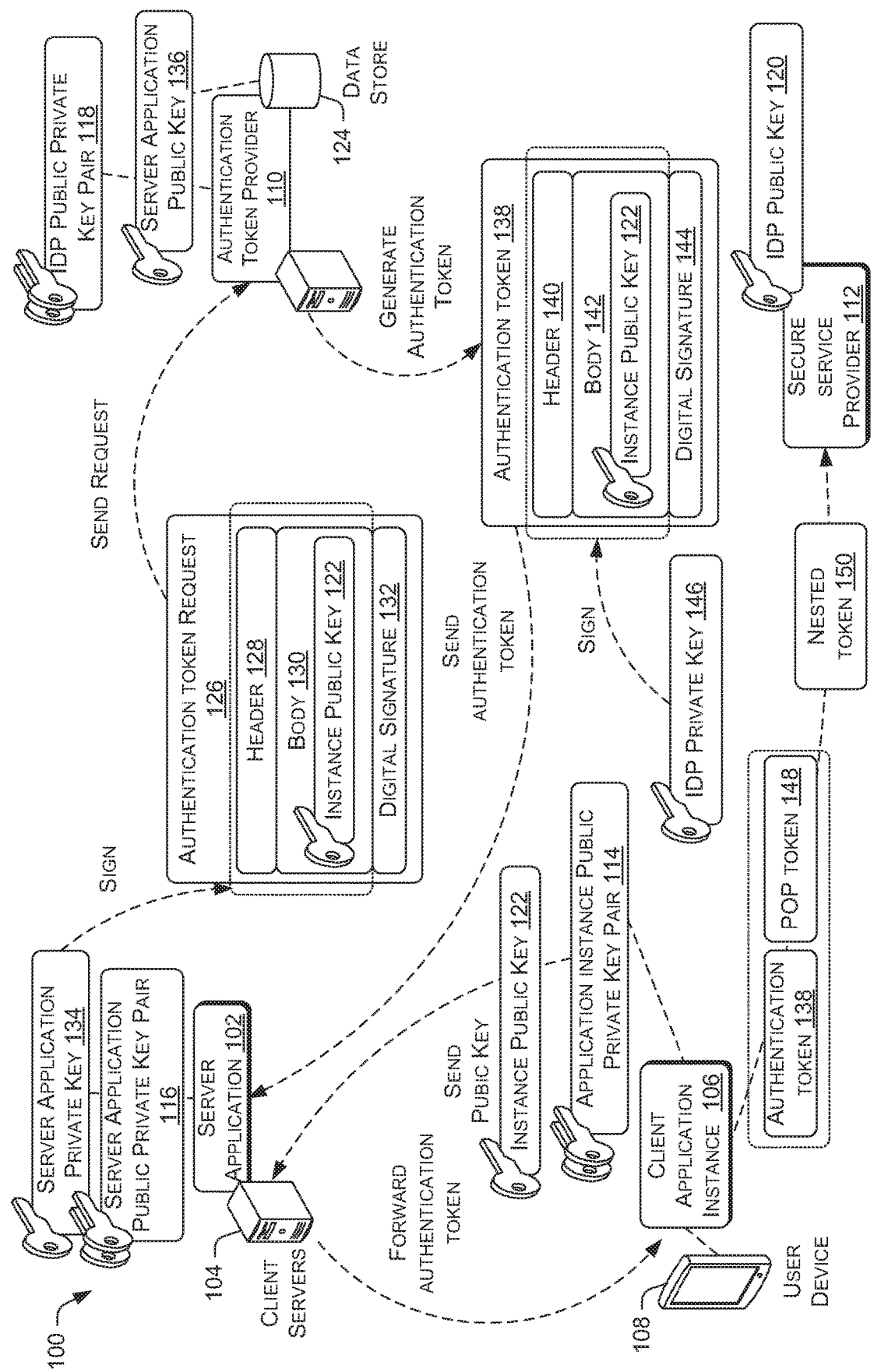
FIG. 1 illustrates an example architecture for a server application to use an authentication token request with a referred application instance public key to enable a client application instance to obtain services from a secure service provider.

An authentication token may be created by an authentication token provider for a user in some single sign-on (SSO) schemes. The authentication token is eventually presented by an application on a user device of a user to a secure service provider to validate the user to the secure service provider. Following the validation of the user, the secure service provider grants the user with access to the secure services provided by the secure service provider. In such a scenario, the user is validated through an authentication token presented by an application on a user device of the user rather than via the user submitting a user identifier and a password via the application. Accordingly, such authentication tokens are known as bearer tokens, which means that any actor may use one of these authentication tokens to obtain secure service from a secure service provider. This is because the secure service provider generally does not make any additional checks to ensure that the authentication token is being presented by the user to whom the authentication token was originally issued. As a result, bearer tokens are susceptible to being stolen and replayed by a malicious actor to obtain services for which the malicious actor is not authorized to use.

Protocols have been developed to prevent a malicious actor from obtaining and replaying authentication tokens that belong to other users to obtain unauthorized access to the services provided by secure service providers. Such protocols involve mandating that an application of the user provide the authentication token provider with a unique key that is associated with the user in a request for an authentication token from the authentication token provider. In various embodiments, the unique key may be a public key of an asymmetric key pair that is generated by the application. The application may be a client application instance on a user device of a user, or a server application executing on a server of a user servicer. In turn, an authentication token provider may verify that the unique key has been previously registered with the authentication token provider as belonging to the application. Accordingly, if the unique key belongs to the application, the authentication token provider may embed the unique key in an authentication token and issue the authentication token to the application. In this way, when the authentication token is presented by an application to request access to a service provided by a secure service provider, the secure service provider may use the unique key that is embedded in the authentication token to verify that the application is authorized to receive the service. In other words, the secure service provider may use the embedded unique key to verify a digital signature that shows that the application is not a rogue application under the control of a malicious actor performing a man-in-the-middle (MITM) attack.

However, the fact that the authentication token issued by the authentication token provider is application-specific may present problems in some usage scenarios. For example, in the context of online banking, a user servicer in the form of a financial institution may provide instances of an online banking application that can be downloaded to the user devices of multiple users. The instances of the online banking application may communicate with a server application on a server of the financial institution to complete financial transactions for individual users. Further, as a part of each financial transaction, the server application of the financial institution may need to obtain a telephone number of the user from a third-party secure service provider, such as a wireless carrier, to complete the transaction.

In such an example, the financial institution or the authentication token provider may have a policy that prohibits individual instances of the online banking application from registering their public-private key pairs directly with the authentication token provider. Instead, the policy may dictate that only the server application of the financial institution can register its public-private key pair with the authentication token provider. Since there may be a large and ever increasing number of client application instances being downloaded and installed on user devices, this policy may be put in place to limit the number of public-private key pairs that have to be stored and tracked by the authentication token provider and/or the financial institution. However, this policy effectively means that only the server application of the financial institution can verify its identity with the authentication token provider in order to obtain an authentication token. In turn, this further means that only the server application of the financial institution can access a secure service (e.g., obtaining a telephone number) provided by the secure service provider.

However, the limitation that only the server application of the financial institution can access the secure service provided by the secure service provider may be undesirable to the financial instruction. Such a limitation means that all instances of the online banking application in use must route their request for secure service from the secure service provider through the server application of the financial institution. This may result in network congestion or slow down for the financial institution. Accordingly, the financial institution may seek a solution in which the financial institution is able to register only the public-private key pairs of the server application with the authentication token provider to obtain authentication tokens, but is able to have the authentication token provider issue authentication tokens directly to the instances of the online bank application. In this way, the instances of the online bank application may directly use the authentication tokens issued by the authentication token provider to directly obtain services from the secure service provider.

The techniques described herein provide a solution in which a user servicer is able to register only the public-private key pairs of a server application with the authentication token provider to obtain authentication tokens, but is able to have the instances of a client application directly use the authentication tokens issued by the authentication token provider to obtain services from the secure service provider. In various embodiments, the techniques involve a server application sending an authentication token request to an authentication token provider, into which the authentication token is signed with a private key of an asymmetric public-private key pair that is generated by the server application. The signed authentication token request is configured with a payload that contains a public key, in which the public key is from an asymmetric public-private key pair that is generated by an instance of the client application. The signed authentication token request is verified by the authentication token provider using a public key of the server application in the possession of the authentication token provider. Once the authentication token provider has validated the signed authentication token request, the authentication token provider may extract the public key of the client application instance from the payload of the authentication token request. The public key of the client application instance is then used by the authentication token provider to generate an authentication token for the specific use of the client application instance. The authentication token is then sent by the authentication token provider to the client application instance, such that the client application instance may use the authentication token to directly obtain services from the secure service provider without the intervention of the user servicer server application.

The techniques may reduce the amount of service access requests that are routed to the server application of the user servicer, thereby decreasing the server processing workload of the user servicer without comprising the security integrity of the service access requests that are made to the secure service providers. Further, such an ability may enable the user servicer to control the number of asymmetric public keys that have to be transmitted to the authentication token provider, thereby minimizing the possibility of potential security breach because public keys are not secret keys that are at the risk being stolen or accessed in an unauthorized manner. Additionally, such an ability may also enable the user servicer to switch between permitting client application instances to directly request services from a secure service provider and routing all such requests through its server application to control secure service provider access by the instances. The techniques described herein may be implemented in a number of ways. Example implementations are provided below with reference to the following figures.

Example Architecture

FIG. 1 illustrates an example architecture 100 for a server application to use an authentication token request with a referred application instance public key to enable a client application instance to obtain services from a secure service provider. The example architecture 100 includes a server application 102 that is executing on one or more client servers 104, and a client application instance 106 that is executing on a user device 108. In various embodiments, the user device 108 may be a mobile handset, a smartphone, a tablet computer, a personal digital assistant (PDA), a smart watch, or any other electronic communication or Internet of Things (IoT) device that is capable of executing applications, such as a web browser application that supports JavaScript. The client application instance 106 may be an instance of any application that provides a service to a user in conjunction with the server application 102 by exchanging data with the server application 102. Thus, there may be multiple instances of a single application that are installed on multiple user devices. For example, in the context of online banking, the client application instance 106 may be a specific instance of an online banking application that the user has installed on the user device 108. Accordingly, the client application instance 106 may enable a user to retrieve financial account information from the server application 102 and initiate financial transactions. In another example, the client application instance 106 may be an instance of an application that enables a user to upload blog postings to a website that is provided by the server application 102 or the secure service provider 112 using the client servers 104. The client application instance 106 may communicate with the server application 102 via a network. The network may include a wireless carrier network, a local area network (LAN), a larger network such as a wide area network (WAN), or a collection of networks, such as the Internet.

The server application 102 may use the network to request authentication tokens from an authentication token provider 110. The authentication token provider 110 is also known as an identity service provider (IDP). Under the user authentication scheme that is in place in the example architecture 100, authentication tokens are created by the authentication token provider 110 for the purpose of indicating that an application or an application instance is authorized to access a secure service provided by a secure service provider 112 on behalf of a user. Thus, a user is able to gain access to the secure service through an application or application instance that is able to present an authentication token to a validation server of the secure service provider 112. This form of token-based authentication is performed in lieu of manually inputting user sign-on credentials, e.g., username and password, for verification by the validation server. Following the validation of the authentication token, the secure service provider 112 may grant the application or application instance access to the secure service. For example, the secure service provider 112 may be wireless carrier network that provides a telephone number of the user to the application or the application instance. In another example, the secure service provider 112 may be a navigation service provider that provides a current geolocation of the user to the application or application instance. In yet another example, the secure service provider 112 may be a blogging service that provides the latest blog entry of the user to the application or application instance.

Each of the client application instance 106, the server application 102, and the authentication token provider 110 may generate a corresponding unique asymmetric public-private key pair. For example, the client application instance 106 may generate an application instance public-private key pair 114, and the server application 102 may generate a server application public-private key pair 116. Likewise, the authentication token provider 110 may generate an IDP public-private key pair 118. In various embodiments, each of the unique asymmetric public-private key pairs may be generated using a key generation algorithm. For example, the public-private key pair may be generated using the Rivest-Shamir-Adleman (RSA) algorithm, the Elliptic-Curve cryptography (ECC) algorithm, the Paillier cryptosystem algorithm, the Cramer-Shoup cryptosystem algorithm, etc. The secure service provider 112 may establish a trust relationship with the authentication token provider 110 by registering with the authentication token provider 110. During the registration of the secure service provider 112, the authentication token provider 110 sends an IDP public key 120 of the IDP public-private key pair 118 to the secure service provider 112 to establish the trust relationship. Further, in order for the server application 102 to request an authentication token on behalf of the client application instance 106, the server application 102 may have the client application instance 106 send an application instance public key 122 of the application instance public-private key pair 114 to the server application 102 in advance of the request. For example, the application instance public key 122 may be obtained by the server application 102 from the client application instance 106 via a pull or push data communication.

In preparation for the server application 102 to request authentication tokens from the authentication token provider 110, the server application 102 may initially complete a registration with the authentication token provider 110. During the registration, the server application 102 may transmit the server application public key 136 along with an identifier of the server application 102 to the authentication token provider 110. The server application public key 136 and the identifier of the server application 102 are stored by the authentication token provider 110 in a data store 124 for later use.

Subsequently, the server application 102 may generate an authentication token request 126. The authentication token request 126 may include a header 128, a body 130, and a digital signature 132. The header 128 may contain data that identify the request as an authentication token request, identify the algorithm that is used to generate the digital signature 132 (e.g., hash-based message authentication code (HMAC) with SHA256, ECDSA, RSASSA-PSS, etc.), identify the components (e.g., header and/or body) that are hashed to generate the signature, etc. The body 130 may contain the application instance public key 122 of the client application instance 106 that was previously received by the server application 102. For example, the body 130 may be configured with a referred binding field that stores the application instance public key 122. The body 130 may further contain the identifier of the server application 102, a time and date stamp for the generation of the request, an expiration time of the request, and/or other information. The digital signature 132 is generated by the server application 102 by signing the header 128 and/or the body 130 with a server application private key 134 of the server application public-private key pair 116. The server application 102 may generate the signature using the digital signature algorithm identified in the header 128.

The authentication token request 126 may be sent by the server application 102 to the authentication token provider 110. In turn, the authentication token provider 110 may use the identifier of the server application 102 as contained in the authentication token request 126 to locate the corresponding server application public key 136 that is stored in the data store 124 and use the public key 136 to validate the digital signature 132. Following a determination that the digital signature 132 is valid, the authentication token provider 110 may extract the application instance public key 122 from the authentication token request 126.

The application instance public key 122 is then used by the authentication token provider 110 to generate an authentication token 138. The authentication token 138 may include a header 140, a body 142, and a digital signature 144. The header 140 may include information regarding the type of the token and the digital signature algorithm that is used for the token (e.g., HMAC with SHA256, ECDSA, RSASSA-PSS, etc.), the components (e.g., header and/or body) that are hashed to generate the signature, etc. The body 142 may include the application instance public key 122 of the client application instance 106. In some embodiments, the body 142 may also contain the identity of the token issuer, an expiration time of the token, and/or other information. The digital signature 144 is generated by the authentication token provider 110 by signing the header 140 and/or the body 142 with an IDP private key 146 of the IDP public-private key pair 118. The authentication token provider 110 may generate the digital signature 144 using the digital signature algorithm identified in the header 140. Accordingly, the digital signature 144 may be used to verify the identity of the sender (authentication token provider 110) and to ensure that the token was not modified since originating from the sender. The authentication token 138 is then sent by the authentication token provider 110 to the server application 102. In turn, the server application 102 may forward the authentication token 138 to the client application instance 106. In various embodiments, the authentication token 138 may be a data structure having the format of a standard JavaScript Object Notation (JSON) web token. However, the authentication token 138 may have other data structure formats that serve a similar purpose in other embodiments. In turn, the authentication token 138 is stored by the client application instance 106 for future use.

Figure 2:
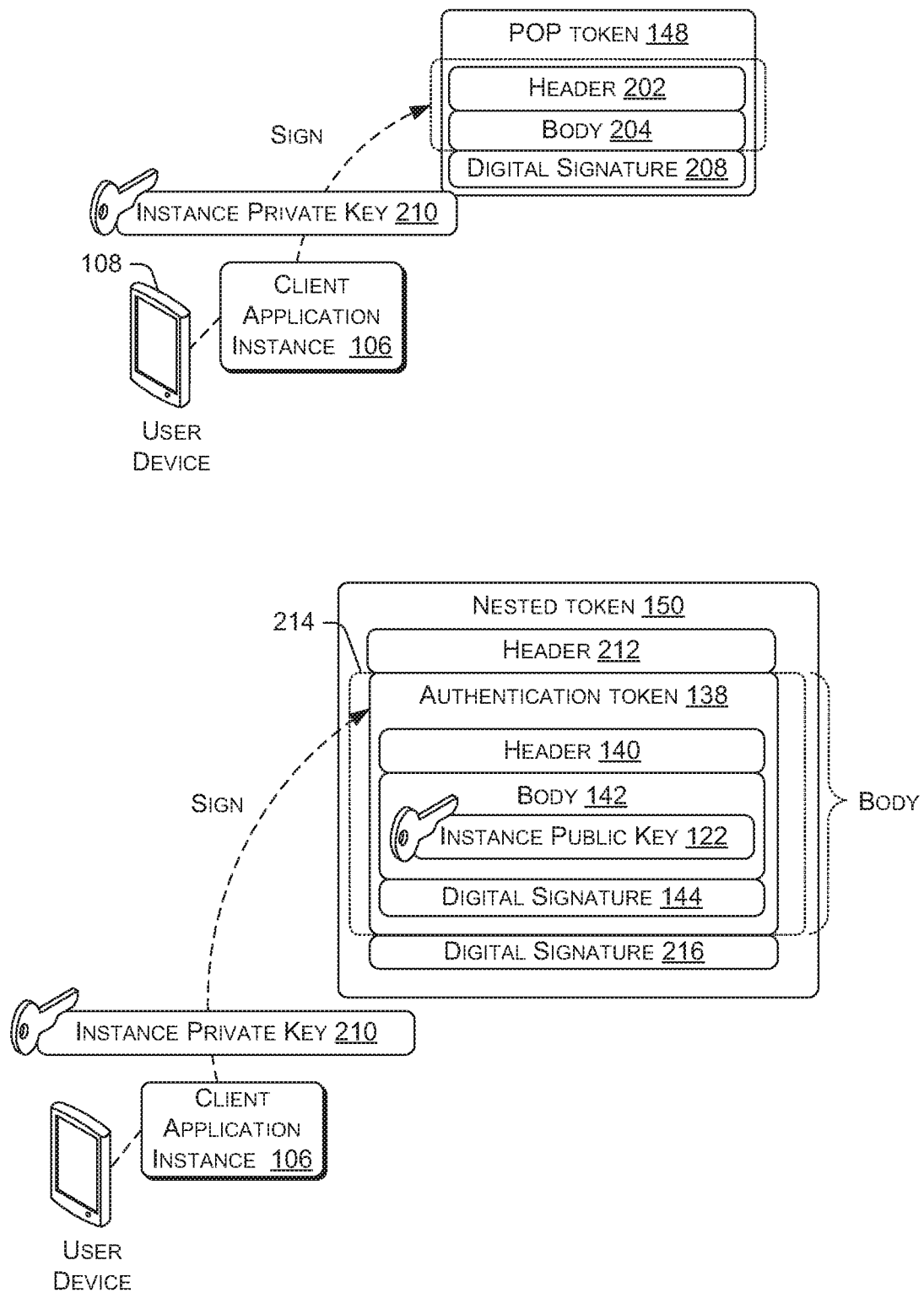
FIG. 2 illustrates multiple types of authentication tokens that the server application is able to obtain from an authentication token provider using an authentication token request with a referred application instance public key.

In some embodiments, the client application instance 106 may use the authentication token 138 in combination with a proof-of-possession (POP) token 148 to request access to a service provided by the secure service provider 112. As shown in FIG. 2, the POP token 148 may be generated by the client application instance 106 on the user device 108. The POP token 148 may include a header 202, a body 204, and a digital signature 208. The header 202 may include information regarding the type of the token and the digital signature algorithm that is used with the token (e.g., HMAC with SHA256, ECDSA, RSASSA-PSS, etc.), the components (e.g., header and/or body) that are hashed to generate the signature, etc. The body 204 may contain payload data that identifies the token issuer (the client application instance 106), an expiration time of the token, and/or other information. The digital signature 208 is generated by signing the header 202 and/or the body 204 with an application instance private key 210 of the application instance public-private key pair 114. The signature may be generated using the digital signature algorithm identified in the header 202. Accordingly, the digital signature 208 may be used to verify that the sender of the POP token is the entity to which the authentication token 138 is issued, and to ensure that the token was not altered since originating from the sender. Returning to FIG. 1, the client application instance 106 may embed the authentication token 138 and the POP token 148 in an authorization header of a Hypertext Transfer Protocol (HTTP) request to deliver the tokens to the secure service provider 112. However, alternative methods of delivering the authentication token 138 and the POP token 148 may be used in other embodiments.

The secure service provider 112 may validate the authentication token 138 and the POP token 148 prior to providing secure service to the client application instance 106. The secure service provider 112 may initially use the IDP public key 120 that is a counterpart to the IDP private key 146 to validate the authentication token 138 that is signed with the digital signature 144. Following the validation of the authentication token 138, the secure service provider may extract the application instance public key 122 from the authentication token 138. The application instance public key 122 is then used by the secure service provider 112 to validate the POP token 148 that is signed with the digital signature 208. By validating the authentication token 138 and the POP token 148, the secure service provider 112 is able to confirm several things: (1) the application instance public key 122 was used to obtain the authentication token 138 from an IDP (the authentication token provider 110) trusted by the secure service provider 112, and (2) the POP token 148 was not altered after being created by the client application instance 106. Furthermore, because the application instance private key 210 of the client application instance 106 was never transmitted over any network, this private key could not have been stolen and used by an unauthorized entity to gain access to the service provided by the secure service provider 112. Thus, following the validation of the authentication token 138 and the POP token 148, the secure service provider 112 may provide the secure service to the client application instance 106.

In some embodiments, the client application instance 106 may generate a nested token 150 that encapsulates the authentication token 138. Subsequently, the client application instance 106 may use the nested token 150 to request access to a secure service provided by the secure service provider 112. As shown in FIG. 2, the nested token 150 may include a header 212, a body 214, and a digital signature 216. The header 212 may include information regarding the type of the token and the algorithm that is used to generate the digital signature for the token (e.g., HMAC with SHA256, ECDSA, RSASSA-PSS, etc.), the components (e.g., header and/or body) that are hashed to generate the signature, etc. The body 214 may include the authentication token 138 and data that identifies the token issuer (the client application instance 106), an expiration time of the token, and/or other information. The digital signature 216 is generated by signing the header 140 and/or the body 142 with an application instance private key 210 of the application instance public-private key pair 114. The signature may be generated using the digital signature algorithm identified in the header 212. Accordingly, the digital signature 216 may be used to verify that the sender of the nested token 150 is the entity to which the authentication token 138 is issued, and to ensure that the token was not altered since originating from the sender. Returning to FIG. 1, the client application instance 106 may embed the nested token 150 in an authorization header of a Hypertext Transfer Protocol (HTTP) request to deliver the tokens to the secure service provider 112. However, alternative methods of delivering the nested token 150 may be used in other embodiments.

The secure service provider 112 may validate the nested token 150 prior to providing service to the client application instance 106. The secure service provider 112 may use the IDP public key 120 to validate the authentication token 138 that is signed with the digital signature 144 that is encapsulated in the body 214 of the nested token 150. Following the validation of the authentication token 138, the secure service provider may extract the application instance public key 122 from the authentication token 138. The application instance public key 122 is then used by the secure service provider 112 to validate that the digital signature 216 of the nested token 150. By validating the nested token 150, the secure service provider 112 is able to confirm several things: (1) the application instance public key 122 was used to obtain the authentication token 138 from an IDP (the authentication token provider 110) trusted by the secure service provider 112, and (2) the nested token 150 was not altered after being created by the client application instance 106. Furthermore, because the application instance private key 210 of the client application instance 106 was never transmitted over any network, this private key could not have been stolen and used by an unauthorized entity to gain access to the service provided by the secure service provider 112. Thus, following the validation of the nested token 150, the secure service provider 112 may provide the secure service to the client application instance 106. While the scheme is described in FIG. 1 with respect to the secure service provider 112, an authentication token generated by the authentication token provider 110 using this scheme may be used with any secure service provider that has formed a trust relationship with the authentication token provider 110 and obtained the IDP public key 120 of the authentication token provider.

Example User Device and Client Server Components

Figure 3:
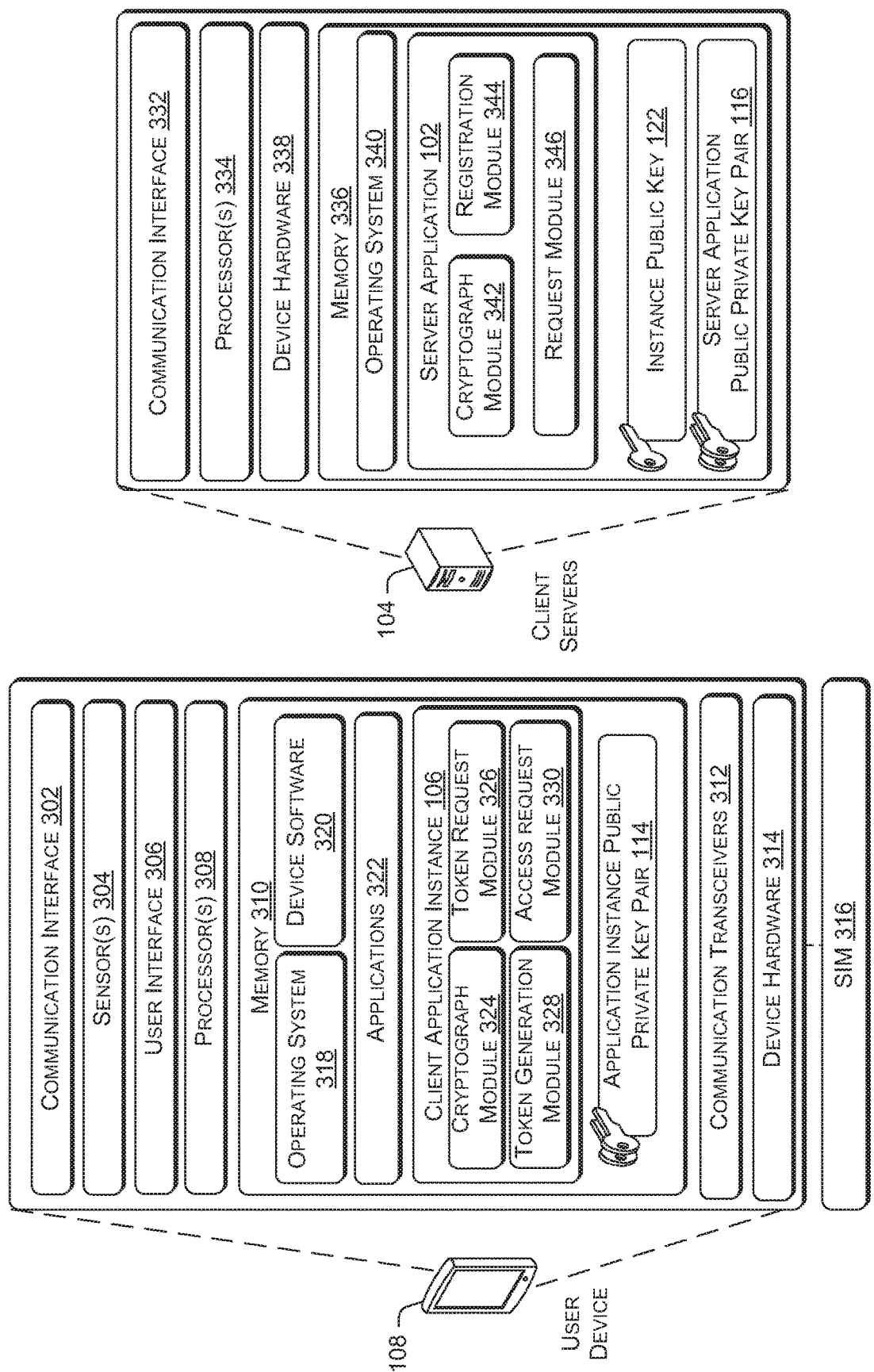
FIG. 3 is a block diagram showing various components of client servers that use an authentication token request with a referred application instance public key to obtain an authentication token for a client application instance, as well various components of the user device that executes the client application instance.

FIG. 3 is a block diagram showing various components of client servers that use an authentication token request with a referred application instance public key to obtain an authentication token for a client application instance, as well various components of the user device that executes the client application instance. The user device 108 may include a communication interface 302, one or more sensors 304, a user interface 306, one or more processors 308, and memory 310. The communication interface 302 may include wireless and/or wired communication components that enable the electronic device to transmit or receive voice or data communication via a wireless carrier network, as well as other telecommunication and/or data communication networks. The sensors 304 may include a proximity sensor, a compass, an accelerometer, altimeter, cameras, and/or a global positioning system (GPS) sensor. The proximity sensor may detect movement of objects that are proximate to the user device 108. The compass, the accelerometer, and the GPS sensor may detect orientation, movement, and geolocation of the user device 108.

The user interface 306 may enable a user to provide inputs and receive outputs from the user device 108. The user interface 306 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 310 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission or non-transitory medium that can be used to store information for access by a computing device. In contrast, communication media may embody computer-readable instructions, data structures, program modules, or other data in a modulated data signal, such as a carrier wave, or other transmission mechanisms.

The user device 108 may also include communication transceivers 312 and other device hardware 314. The communication transceivers are hardware components that enable the user device 108 to perform telecommunication and data communication with the multiple communications network, such as the wireless carrier network and a remote network. The device hardware 314 may include other hardware that is typically located in a mobile telecommunication device. For example, the device hardware 314 may include signal converters, transceivers, antennas, hardware decoders and encoders, graphics processors, a SIM card slot, and/or the like that enable the user device 108 to execute applications and provide telecommunication and data communication functions. The SIM 316 may be an integrated circuit chip that is inserted into the SIM card slot of the user device 108, or an embedded SIM that is hardwired into the circuit board of the user device 108.

The one or more processors 308 and the memory 310 of the user device 108 may implement an operating system 318, device software 320, one or more applications 322, and the client application instance 106. The various software and applications may include routines, program instructions, code segments, objects, and/or data structures that perform particular tasks or implement particular abstract data types. The operating system 318 may include components that enable the user device 108 to receive and transmit data via various interfaces (e.g., user controls, communication interface 302, and/or memory input/output devices). The operating system 318 may also process data using the one or more processors 308 to generate outputs based on inputs that are received via the user interface 306. For example, the operating system 318 may provide an execution environment for the execution of the applications 322 and the client application instance 106. The operating system 318 may include a presentation component that presents the output (e.g., display the data on an electronic display, store the data in memory, transmit the data to another electronic device, etc.).

The operating system 318 may include an interface layer that enables applications to interface with the communication transceivers 312 and/or the communication interface 302. The interface layer may comprise public APIs, private APIs, or a combination of both public APIs and private APIs. Additionally, the operating system 318 may include other components that perform various other functions generally associated with an operating system. The device software 320 may include software components that enable the user device to perform functions. For example, the device software 320 may include basic input/output system (BIOS), Boot ROM, or a bootloader that boots up the user device 108 and executes the operating system 318 following power-up of the device.

The applications 322 may include applications that provide utility, entertainment, and/or productivity functionalities to a user of the user device 108. For example, the applications 322 may include a rich communication service (RCS) application, a video calling application, a Wi-Fi calling application, a VoLTE calling application, and/or so forth. The applications 322 may further include electronic mail applications, remote desktop applications, web browser applications, navigation applications, office productivity applications, multimedia streaming applications, and/or so forth. The applications 322 may include client application instances that are similar to the client application instance 106. Further, the client application instance 106 may also provide utility, entertainment, and/or productivity functionalities to a user of the user device 108.

The client application instance 106 may include a cryptograph module 324, a token request module 326, a token generation module 328, and an access request module 330. The cryptograph module 324 may use an asymmetric key pair generation algorithm to generate the application instance public-private key pair 114. For example, the asymmetric key pair generation algorithm may be the Rivest-Shamir-Adleman (RSA) algorithm, the Elliptic-Curve cryptography (ECC) algorithm, the Paillier cryptosystem algorithm, the Cramer-Shoup cryptosystem algorithm, etc.

The token request module 326 may request an authentication token, such as the authentication token 138, from the authentication token provider 110. In some instances, the token request module 326 may pass the request and the application instance public key 122 to the server application 102, such that the server application 102 may request an authentication token, e.g., authentication token 138, on behalf of the client application instance 106. The authentication token is then forwarded by the server application 102 to the client application instance 106. In turn, the token request module 326 may store the authentication token in a data store accessible to the client application instance 106. In other instances, the server application 102 may initiate the generation of an authentication token for the client application instance 106 based on the application instance public key 122 without an initiation by the token request module 326.

The token generation module 328 may generate a POP token, such as the POP token 148, and/or a nested token, such as the nested token 150, based on an authentication token, such as the authentication token 138. The generation of a token involves the creation of a digital signature from the body and/or header. In various embodiments, the digital signature is created by calculating a cryptographic hash of the body and/or header via an algorithm (e.g., HMAC with SHA256, ECDSA, RSASSA-PSS, etc.), and then digitally signing with a private key, such as the application instance private key 210, to generate the digital signature. In this way, another entity may use the corresponding public key, such as the application instance public key 122, to verify the digital signature.

The access request module 330 may send a request for service to a secure service provider, such as the secure service provider 112. Each of the requests may be accompanied by a combination of an authentication token 138 and a POP token 148, or alternatively a nested token 150, that enables a secure service provider to validate the request as coming from a valid source and free from tampering. In turn, a secure service provider may grant the client application instance 106 access to the service in response to the request following the validation of the one or more tokens.

The server application 102 may execute on one or more client servers 104. The client servers 104 may include any electronic devices that are capable of receiving inputs, processing the inputs, and generating output data. In other embodiments, the client servers 104 or components thereof may be virtual computing devices in the form of virtual machines or software containers that are hosted in a computing cloud. The client servers 104 may include a communication interface 332, one or more processors 334, memory 336, and device hardware 338. The communication interface 332 may include wireless and/or wired communication components that enable the client servers 104 to transmit data to and receive data from other networked devices. The device hardware 338 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 336 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission or non-transitory medium that can be used to store information for access by a computing device. In contrast, communication media may embody computer-readable instructions, data structures, program modules, or other data in a modulated data signal, such as a carrier wave, or other transmission mechanisms.

The processors 334 and the memory 336 of the client servers 104 may implement an operating system 340 and a server application 102. The operating system 340 may include components that enable the client servers 104 to receive and transmit data via various interfaces (e.g., user controls, communication interface, and/or memory input/output devices), as well as process data using the processors 308 to generate output. The operating system 340 may include a presentation component that presents the output (e.g., display the data on an electronic display, store the data in memory, transmit the data to another electronic device, etc.). Additionally, the operating system 340 may include other components that perform various additional functions generally associated with an operating system.

The server application 102 may include a cryptograph module 342, a registration module 344, and a request module 346. Each of these modules may include routines, program instructions, code segments, objects, and/or data structures that perform particular tasks or implement particular abstract data types. The cryptograph module 342 may use an asymmetric key pair generation algorithm to generate the server application public-private key pair 116. For example, the asymmetric key pair generation algorithm may be the Rivest-Shamir-Adleman (RSA) algorithm, the Elliptic-Curve cryptography (ECC) algorithm, the Paillier cryptosystem algorithm, the Cramer-Shoup cryptosystem algorithm, etc. The registration module 344 may send a registration request to an authentication token provider, such as the authentication token provider 110, in order to receive authentication tokens. The registration request may include the server application public-private key pair 116 along with an identifier of the server application 102. In turn, the authentication token provider 110 may store the server application public-private key pair 116 and the identifier of the server application 102 in a data store to complete the registration of the server application 102. The request module 346 may generate an authentication token request, such as the authentication token request 126, on behalf of a client application instance (e.g., client application instance 106). For example, the request module 346 may generate the authentication token request 126 by encapsulating the application instance public key 122 in the request, and signing the request with a server application private key 134 of the server application 102. Upon receiving an authentication token that is generated in response to the request, such as the authentication token 138, the request module 346 may use the network to forward the authentication token to the client application instance.

Example Authentication Token Server Components

Figure 4:
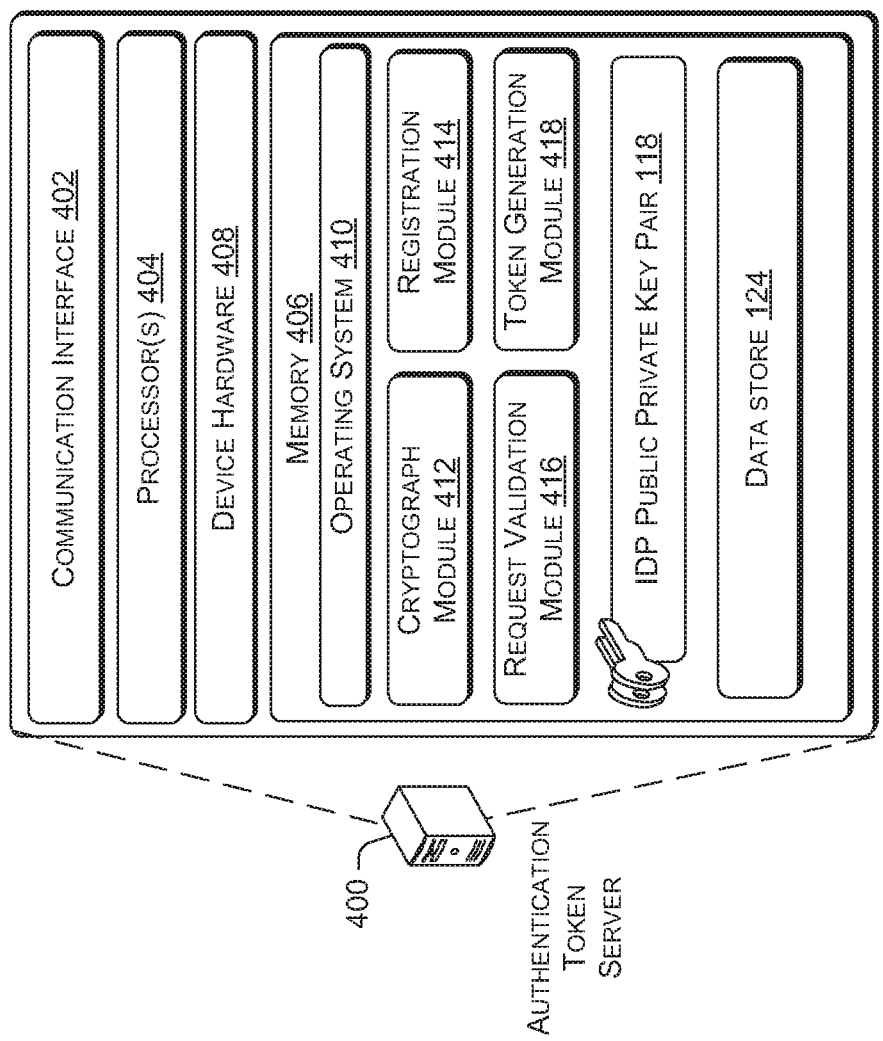
FIG. 4 is a block diagram showing various components of an authentication token provider server that issues an authentication token for a client application instance in response to receiving an authentication token request with a referred application instance public key from a server application.

FIG. 4 is a block diagram showing various components of an authentication token server of the authentication token provider that issues an authentication token for a client application instance in response to receiving an authentication token request with a referred application instance public key from a server application. The authentication token server 400 may include any electronic devices that are capable of receive inputs, process the inputs, and generate output data. In other embodiments, the client servers 104 or components thereof may be virtual computing devices in the form of virtual machines or software containers that are hosted in a computing cloud. In other embodiments, the authentication token server 400 or components thereof may be virtual computing devices in the form of virtual machines or software containers that are hosted in a computing cloud.

The authentication token server 400 may include a communication interface 402, one or more processors 404, memory 406, and device hardware 408. The communication interface 402 may include wireless and/or wired communication components that enable the authentication token server 400 to transmit data to and receive data from other networked devices. The device hardware 408 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 406 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission or non-transitory medium that can be used to store information for access by a computing device. In contrast, communication media may embody computer-readable instructions, data structures, program modules, or other data in a modulated data signal, such as a carrier wave, or other transmission mechanisms.

The processors 404 and the memory 406 of the authentication token server 400 may implement an operating system 410. The operating system 410 may include components that enable the authentication token server 400 to receive and transmit data via various interfaces (e.g., user controls, communication interface, and/or memory input/output devices), as well as process data using the processors 404 to generate output. The operating system 410 may include a presentation component that presents the output (e.g., display the data on an electronic display, store the data in memory, transmit the data to another electronic device, etc.). Additionally, the operating system 410 may include other components that perform various additional functions generally associated with an operating system.

The authentication token server 400 may implement a cryptograph module 412, a registration module 414, a request validation module, and a token generation module 418. Each of these modules may include routines, program instructions, code segments, objects, and/or data structures that perform particular tasks or implement particular abstract data types. The cryptograph module 412 may use an asymmetric key pair generation algorithm to generate the IDP public-private key pair 118. For example, the asymmetric key pair generation algorithm may be the Rivest-Shamir-Adleman (RSA) algorithm, the Elliptic-Curve cryptography (ECC) algorithm, the Paillier cryptosystem algorithm, the Cramer-Shoup cryptosystem algorithm, etc. The registration module 414 may receive registration requests for obtaining authentication tokens from server applications, such as the server application 102. For example, a registration request from the server application 102 may include the server application public-private key pair 116 along with an identifier of the server application 102 to the authentication token provider 110. In turn, the registration module 414 may register the server application 102 and store the server application public-private key pair 116 and the identifier of the server application 102 in the data store 124.

The request validation module 416 may validate the authentication token requests that are received from server applications, such as the server application 102, by validating digital signatures included in the requests with corresponding server application public keys that are stored in the data store 124. For example, with respect to the authentication token request 126, the request validation module 416 may initially use an identifier of the server application 102 included in the request to retrieve the corresponding server application public key 136 from the data store 124. The application instance public key 122 is then used by the request validation module 416 to verify the digital signature 132.

The token generation module 328 may generate an authentication token for a corresponding validated authentication token request. The generation of the authentication token involves the creation of a digital signature from the body and/or header of the token. In various embodiments, the digital signature is created using a digital signature algorithm (e.g., e.g., HMAC with SHA256, ECDSA, RSASSA-PSS, etc.).

Example Processes

Figure 5:
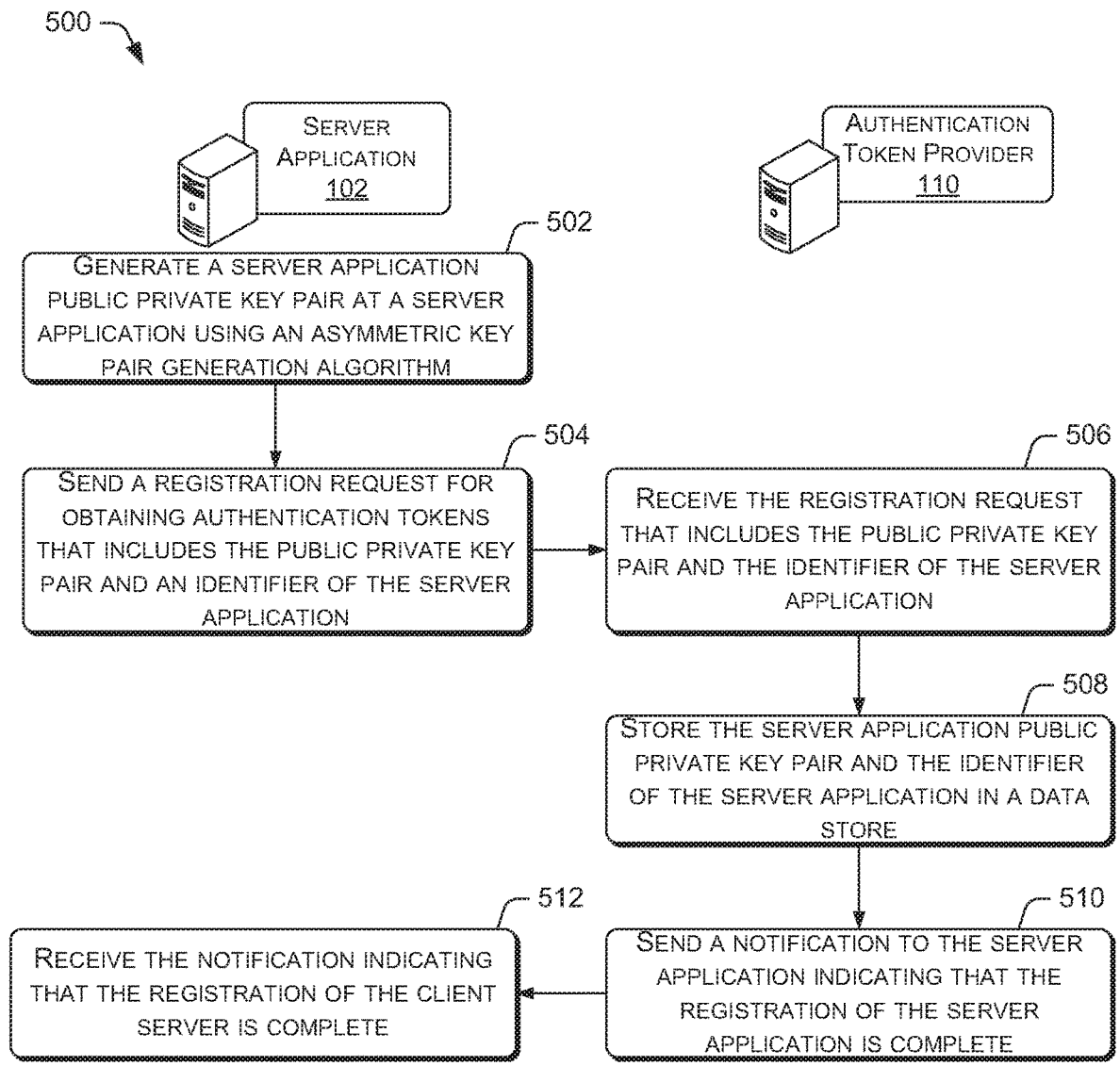
FIG. 5 is a flow diagram of an example process for a server application to register with an authentication token provider in order to use an authentication token request with a referred application instance public key to obtain an authentication token for a client application instance.
Figure 6:
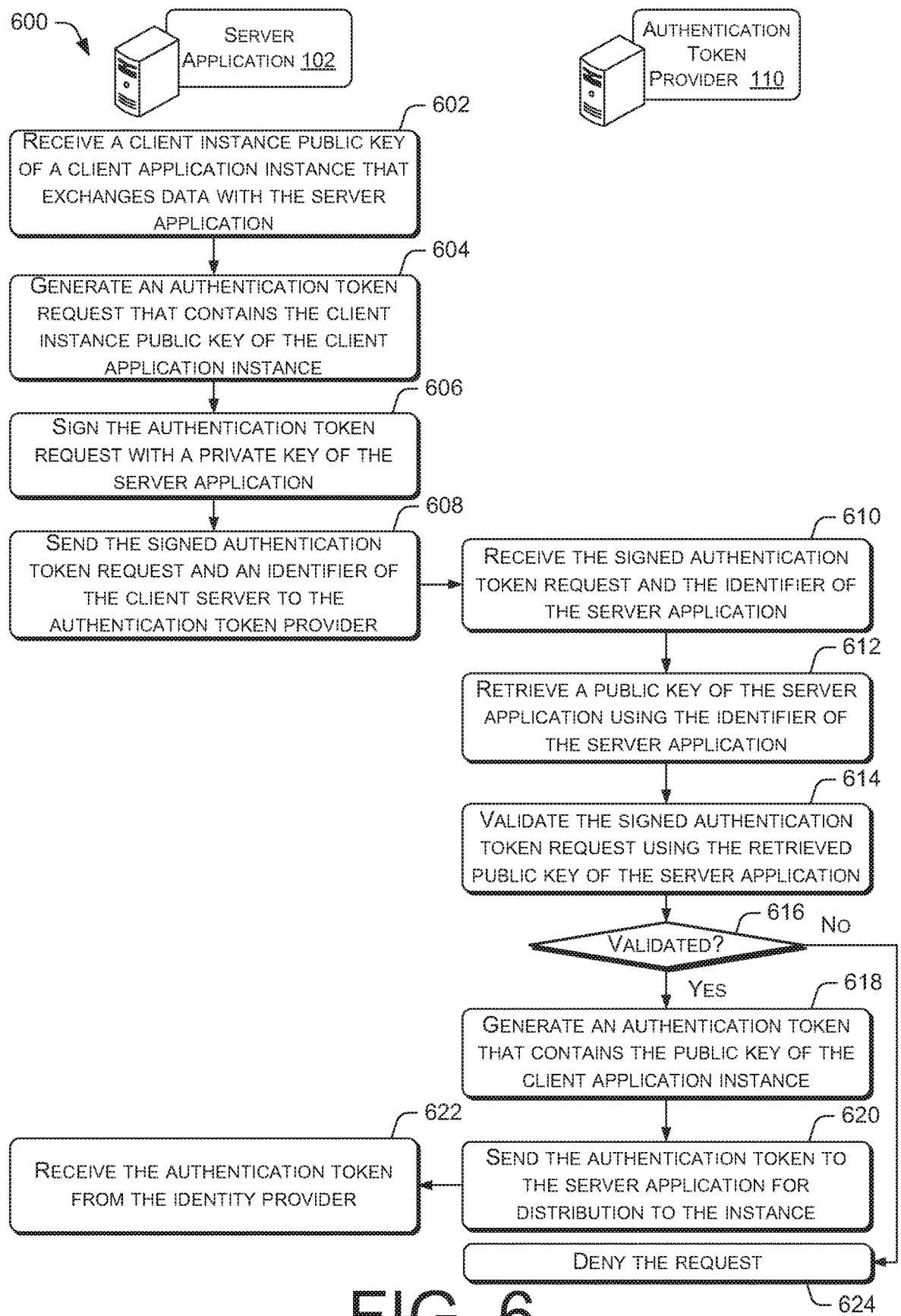
FIG. 6 is a flow diagram of an example process for a server application to request an authentication token for a client application instance from an authentication token provider using an authentication token request with a referred application instance public key.
Figure 7:
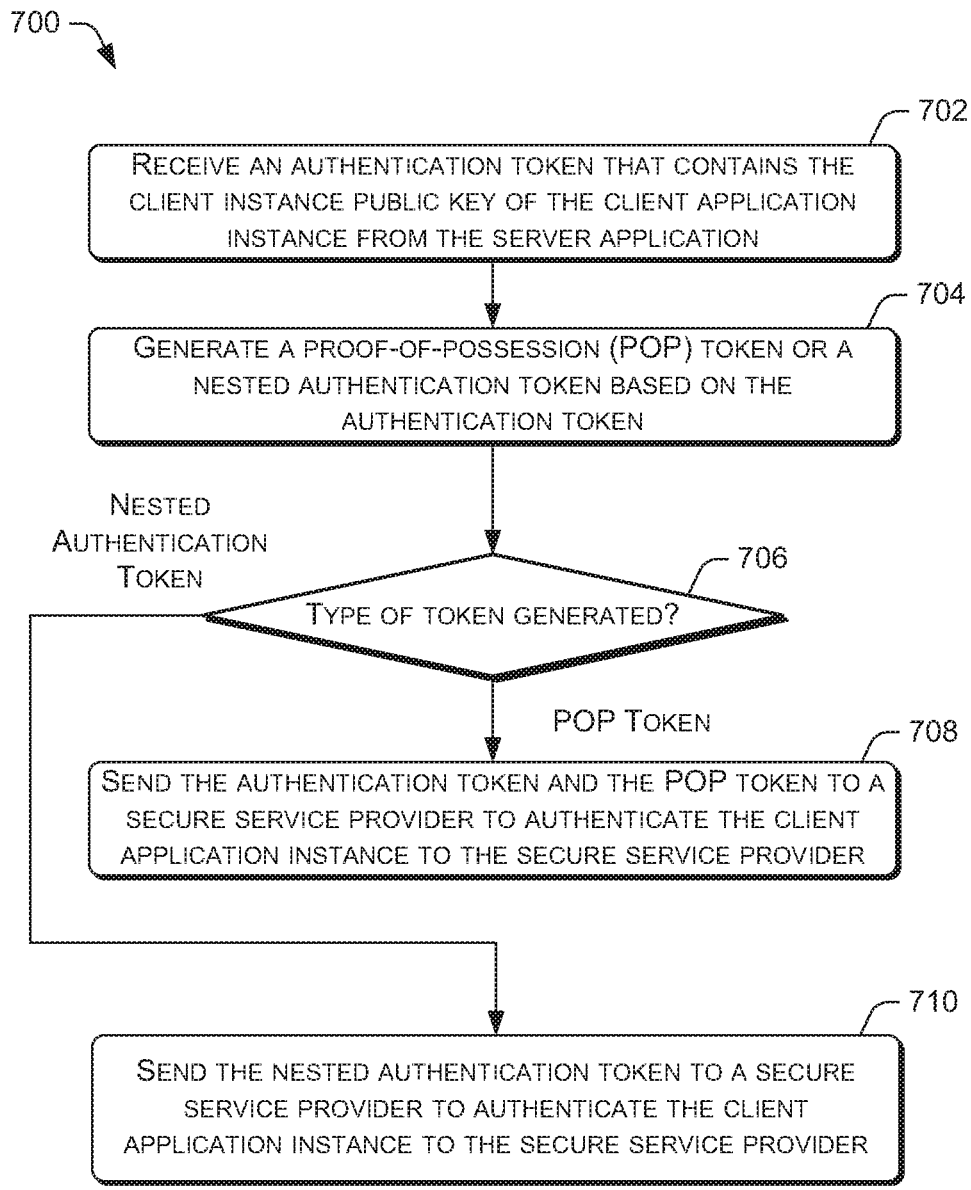
FIG. 7 is a flow diagram of an example process for a client to generate an authentication token.

FIGS. 5-7 present illustrative processes 500-700 for using an authentication token request with a referred application instance public key to enable a client application instance to obtain secure services from a secure service provider. Each of the processes 500-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-700 are described with reference to the architecture 100 of FIG. 1.

FIG. 5 is a flow diagram of an example process 500 for a server application to register with an authentication token provider in order to use an authentication token request with a referred application instance public key to obtain an authentication token for a client application instance. At block 502, the server application 102 may generate a server application public-private key pair 116 using an asymmetric key pair generation algorithm. For example, the server application public-private key pair 116 may be generated using the Rivest-Shamir-Adleman (RSA) algorithm, the Elliptic-Curve cryptography (ECC) algorithm, the Paillier cryptosystem algorithm, the Cramer-Shoup cryptosystem algorithm, etc. At block 504, the server application 102 may send a registration request that registers the server application 102 to obtain authentication tokens from the authentication token provider 110. In various embodiments, the request may include the server application public-private key pair 116 and an identifier of the server application 102.

At block 506, the authentication token provider 110 may receive the registration request that includes the server application public-private key pair 116 and the identifier of the server application 102. However, in some embodiments, rather than sending the entire key pair, the authentication token provider may send only the server application public key 136 of the key pair 116 to the authentication token provider 110. At block 508, the authentication token provider 110 may store the server application public-private key pair 116 and the identifier of the server application in the data store 124 of the authentication token provider 110. The server application public-private key pair 116 and the identifier of the server application are stored as associated data such that the key pair can be looked up and retrieved using the identifier. However, in embodiments in which only the server application public key 136 of the key pair 116 is received, the authentication token provider 110 may store the server application public key 136 instead of the key pair 116.

At block 510, the authentication token provider 110 may send a notification indicating that the registration of the server application is complete. At block 512, the server application 102 may receive the notification that the registration of the server application is complete.

FIG. 6 is a flow diagram of an example process 600 for a server application to request an authentication token for a client application instance from an authentication token provider using an authentication token request with a referred application instance public key. At block 602, the server application 102 may receive an application instance public key 122 of the client application instance 106 that exchanges data with the server application 102. The client application instance 106 may exchange data with the server application 102 to provide a service to the user of the client application instance 106. The application instance public key 122 belongs to the application instance public-private key pair 114 that is generated by the asymmetric key pair generation algorithm.

At block 604, the server application 102 may generate the authentication token request 126 for transmission to the authentication token provider 110, in which the authentication token request 126 includes the application instance public key 122 of the client application instance 106. In various embodiments, the application instance public key 122 is stored in the body 130 of the request.

At block 606, the server application 102 may sign the authentication token request 126 with the server application private key 134 of the server application 102. In various embodiments, the signing of the authentication token request 126 by the server application 102 generates the digital signature 132. At block 608, the server application 102 may send the signed authentication token request 126 and the identifier of the server application 102 to the authentication token provider 110. In some instances, the identifier of the server application 102 may be contained in the body 130 of the signed authentication token request 126.

At block 610, the authentication token provider 110 may receive the signed authentication token request 126 and the identifier of the server application 102. At block 612, the authentication token provider 110 may use the identifier of the server application 102 to retrieve the server application public key 136 of the server application from the data store 124 of the authentication token provider 110. At block 614, the authentication token provider 110 may validate the signed authentication token request 126 using the retrieved server application public key 136 of the server application 102.

At the decision block 616, the authentication token provider 110 may determine whether the signed authentication token request 126 is validated. Accordingly, if the signed authentication token request 126 is validated ("yes" at decision block 616), the process 600 may proceed to block 618. At block 618, the authentication token provider 110 may generate the authentication token 138. In various embodiments, the application instance public key 122 of the client application instance 106 is embedded in the body 142 of the authentication token 138. The authentication token 138 includes a digital signature 144 that is generated using the IDP private key of 146 of the authentication token provider 110.

At block 620, the authentication token provider 110 may send the authentication token 138 to the server application for distribution to the client application instance 106. At block 622, the server application 102 may receive the authentication token 138. In turn, the authentication token 138 is distributed by the server application 102 to the client application instance 106. Accordingly, the client application instance 106 may use the authentication token 138 to obtain services from a secure service provider, such as the secure service provider 112. Returning to decision block 616, if the signed authentication token request is determined to be invalid ("no" at decision block 616, the process 600 may proceed to block 624. At block 624, the authentication token provider 110 may deny the authentication token request 126. In various embodiments, the authentication token provider 110 may send the denial indication to the server application 102.

FIG. 7 is a flow diagram of an example process 700 for a client application instance to generate an authentication token. At block 702, the client application instance 106 may receive the authentication token 138 that contains the application instance public key 122 of the client application instance 106 from the server application 102. The client application instance 106 may execute on the user device 108, and the server application 102 may execute on one or more client server 104. At block 704, the client application instance 106 may generate the POP token 148 or the nested token 150 based on the authentication token 138. In various embodiments, whether the client application instance 106 generates the POP token 148 or the nested token 150 may be dependent on a configuration setting of the client application instance 106. In turn, the client application instance 106 may be configured based on the authentication specifications promogulated by secure service providers. At decision block 706, the client application instance 106 may determine which token to send to a secure service provider (e.g., secure service provider 112) according to the type of token that is generated.

Accordingly, if the POP token 148 is generated, the process 700 may proceed to block 708. At block 708, the client application instance 106 may send the authentication token and the POP token to the secure service provider 112 to authenticate the client application instance to the secure service provider 112. However, if the nested authentication token is generated, the process 700 may proceed to block 710. At block 710, the client application instance 106 may send the nested token 150 to the secure service provider 112 to authenticate the client application instance to the secure service provider 112.

The embodiments provide a user servicer with the ability to register only the public-private key pairs of a server application with the authentication token provider while prompt the authentication token provider to issue authentication tokens that are directly usable by instances of a client application. Such an ability may reduce the amount of service access requests are routed to the server application of the user servicer, thereby decreasing the server processing workload of the user servicer without comprising the security integrity of the service access requests that are made to the secure service providers. Further, such an ability may enable the user servicer to control the number of asymmetric public-private key pairs that have to be transmitted to the authentication token provider, thereby minimizing the possibility of potential security breach. Additionally, such an ability may also enable the user servicer to switch between permitting client application instances to directly request services from a secure service provider and routing all such requests through its server application to control secure service provider access by the instances.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions of a server application that upon execution cause one or more processors to perform acts comprising:
   receiving, at the server application on a server of an online user servicer that provides an online service to the user device, an application instance public key of a client application instance on a user device, the application instance public key belonging to an application instance public-private key pair of the client application instance;
   generating, at the server application on the server of the online user servicer, an authentication token request that includes the application instance public key of the client application instance and is signed using a server application private key of a server application public-private key pair that belongs to the server application following a registration of the server application with an authentication token provider on an additional server;
   sending, by the server application on the server of the online user servicer, the authentication token request to the authentication token provider to request an authentication token for use by the client application instance;
   receiving, at the server application on the server of the online user servicer, the authentication token that is generated by the authentication token provider, the authentication token including the application instance public key of the client application instance and is signed using an identity provider private key of an identity provider public-private key pair that belongs to the authentication token provider; and
   forwarding, from the server application on the server of the online user servicer that received the authentication token from the authentication token provider, the authentication token as generated by the authentication token provider to the client application instance on the user device.

2. The one or more non-transitory computer-readable media of claim 1, wherein the acts further comprise sending a server application public key of the server application public-private key pair to the authentication token provider during the registration of the server application with the authentication token provider.

3. The one or more non-transitory computer-readable media of claim 2, wherein the acts further comprise signing the authentication token request, the signing including:
   calculating, at the server application, a digital signature for at least a body of the authentication token request that includes the application instance public key of the client application instance, the digital signature being verified by the authentication token provider via the server application public key to validate the authentication token request.

4. The one or more non-transitory computer-readable media of claim 1, wherein the authentication token includes a header and a body that stores the application instance public key, and wherein using the server application private key includes hash at least one of the header or the body of the authentication token request with the server application private key to generate a digital signature.

5. The one or more non-transitory computer-readable media of claim 4, wherein the authentication token is used by the client application instance to obtain a secure service from a secure service provider.

6. The one or more non-transitory computer-readable media of claim 5, wherein the secure service provider is in possession of an identity provider public key that is a counterpart to the identity provider private key of the authentication token provider, and wherein the identity provider public key is used by the secure service provider to validate the authentication token for providing the secure service to the client application instance.

7. The one or more non-transitory computer-readable media of claim 5, wherein the authentication token is used in combination with an additional token that is signed with an application instance private key of the application instance public-private key pair that belongs to the client application instance to obtain the secure service from the secure service provider.

8. The one or more non-transitory computer-readable media of claim 5, wherein the authentication token is further encapsulated in a nested token that is signed with an application instance private key of the application instance public-private key pair that belongs to the client application instance.

9. A computer-implemented method, comprising:
   receiving, at a server of an authentication token provider, an authentication token request from a server application on an additional server of an online user servicer that is registered with the authentication token provider, the authentication token request including an application instance public key of an application instance public-private key pair that belongs to a client application instance on a user device, and is signed with a server application private key of a server application public-private key pair that belongs to the server application;
   validating, at the authentication token provider, the authentication token request via a server application public key of the server application public-private key pair;
   in response to determining that the authentication token request is valid, sending from the server of the authentication token provider to the server application on the additional server of the online user servicer, an authentication token that includes the application instance public key of the client application instance such that the authentication token is forwarded by the server application on the additional server of the online user servicer to the client application instance on the user device; and
   in response to determining that the authentication token request is invalid, sending from the server of the authentication token provider to the server application on the additional server of the online user servicer a denial of the authentication token request.

10. The computer-implemented method of claim 9, wherein the authentication token is signed with an identity provider private key of an identity provider public-private key pair that belongs to the authentication token provider.

11. The computer-implemented method of claim 10, further comprising signing the authentication token, the signing including:
calculating, at the server application, a digital signature for at least a body of the authentication token that includes the application instance public key of the client application instance, the digital signature being decrypted by a secure service provider that is in possession of an identity provider public key that is a counterpart to the identity provider private key.

12. The computer-implemented method of claim 11, wherein the digital signature is verified with the identity provider public key by the secure service provider to validate the authentication token.

13. The computer-implemented method of claim 9, further comprising receiving the server application public key from the server application during a registration of the server application with the authentication token provider.

14. The computer-implemented method of claim 10, wherein the authentication token is used by the client application instance to obtain a secure service from a secure service provider.

15. The computer-implemented method of claim 14, wherein authentication token is used in combination with an additional token that is signed with an application instance private key of the application instance public-private key pair that belongs to the client application instance to obtain the secure service from the secure service provider.

16. The computer-implemented method of claim 14, wherein the authentication token is further encapsulated in a nested token that is signed with an application instance private key of the application instance public-private key pair that belongs to the client application instance.

17. A server of an online user servicer, comprising:
one or more processors; and
memory including a plurality of computer-executable components of a server application that are executable by the one or more processors to perform a plurality of actions, the plurality of actions comprising:
receiving, at the server application on the server of an online user servicer, an application instance public key of a client application instance on a user device, the application instance public key belonging to an application instance public-private key pair of the client application instance;
generating, at the server application on the server of the online user servicer, an authentication token request that includes the application instance public key of the client application instance and is signed with a server application private key of a server application public-private key pair that belongs to the server application following a registration of the server application with an authentication token provider on an additional server;
sending, by the server application on the server of the online user servicer, the authentication token request to the authentication token provider to request an authentication token, the authentication token configured to enable the client application instance to obtain a secure service from a secure service provider;
receiving, at the server application on the server of the online user servicer, the authentication token that is generated by the authentication token provider on the additional server, the authentication token including the application instance public key of the client application instance and is signed using an identity provider private key of an identity provider public-private key pair that belongs to the authentication token provider; and
forwarding, from the server application on the server of the online user servicer that received the authentication token from the authentication token provider, the authentication token as generated by the authentication token provider to the client application instance on the user device.

18. The server of claim 17, wherein the actions further comprise sending a server application public key of the server application public-private key pair to the authentication token provider during the registration of the server application with the authentication token provider.

19. The server of claim 18, wherein the acts further comprise signing the authentication token request, the signing including:
calculating, at the server application, a digital signature for at least a body of the authentication token request that includes the application instance public key of the client application instance, the digital signature being decrypted by the authentication token provider via the server application public key to validate the authentication token request.

20. The server of claim 17, wherein the authentication token includes the application instance public key of the client application instance and is signed with an identity provider private key of an identity provider public-private key pair that belongs to the authentication token provider, and wherein the secure service provider is in possession of an identity provider public key that is a counterpart to the identity provider private key of the authentication token provider, and wherein the identity provider public key is used by the secure service provider to validate the authentication token for providing the secure service to the client application instance.

* * * * *